3,457,846
TEMPERATURE INDICATING ATTACHMENT FOR DEVELOPING TYPE CAMERAS
Ralph Little, 1117 Little St., Camden, S.C. 29020
Filed Dec. 12, 1966, Ser. No. 600,876
Int. Cl. G03b 17/50
U.S. Cl. 95—13     5 Claims

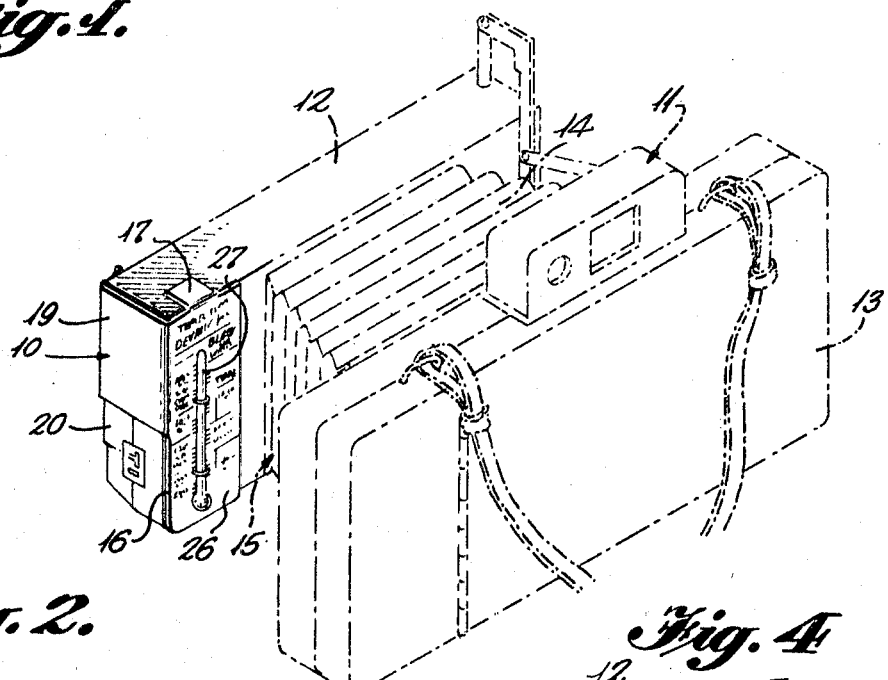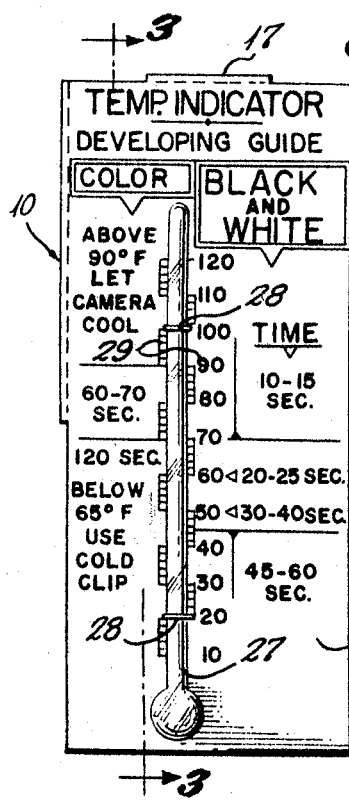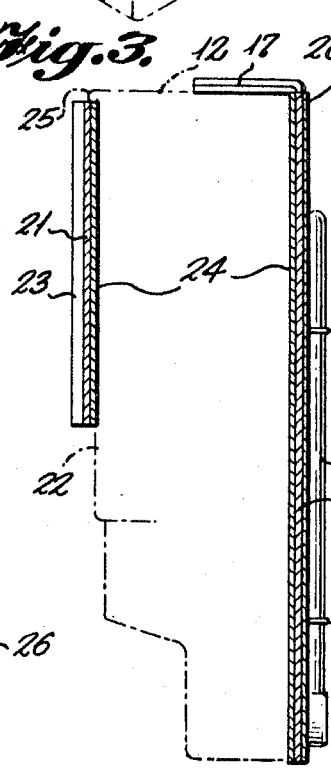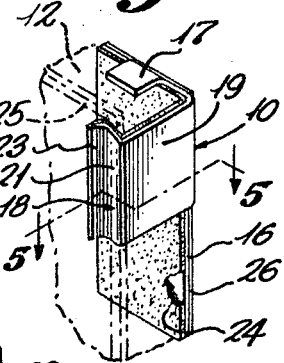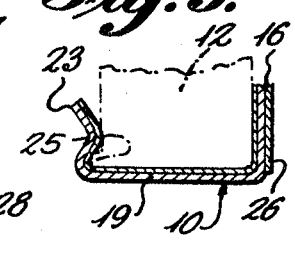

ABSTRACT OF THE DISCLOSURE

A temperature indicating and development guide attachment for a self-developing camera. The temperature indicating device is attached to the camera by way of a clip having a flat plate adapted to lie against one camera wall, having a stop tab on the top of the plate at right angles thereto and adapted to abut against another wall of the camera. An L-shaped extension on another side of the plate having an intermediate bend in the outside leg thereof engages a projection in the camera shutter housing, locking the plate in close relationship with the camera wall. The temperature indicating device and viewable indicia are on the side of the plate remote from the stop tab and L-shaped extension.

Background of the invention

The invention relates to a temperature indicating and film developing guide attachment for the class of cameras known in the art as developing cameras.

Developing type cameras have become increasingly popular in recent years for the taking of black and white and color pictures. Highly reliable developing film packs are available for these cameras allowing unskilled photographers to develop their films a few moments after taking snapshots. One difficulty encountered is that seasonal temperature changes seriously affect the developing characteristics of the film and require variations in developing time, either upwardly or downwardly, dependent upon temperature changes. In view of this, a need has arisen for some ready means to enable the photographer to note the temperature where the picture is being taken and to correlate this temperature with the proper time period for allowing development before final removal of the finished print. No ready or convenient means for these purposes has been available in the prior art.

Summary of the invention

The invention overcomes the above needs and deficiencies of the prior art through the provision of a simplified clip attachment having a unique interlocking engagement with the shutter housing of the most popular commercial developing type camera. The clip attachment serves to mount a sensitive thermometer in such a manner that the thermometer lies close to the film pack and within the bellows space when the camera is closed. Adjacent to the thermometer is printed indicia establishing the most desirable times for development for various temperature ranges.

Brief description of the drawings

FIGURE 1 is a perspective view of a temperature indicating attachment according to the invention and showing the same applied to a developing type camera, the latter being indicated in broken lines;

FIGURE 2 is an enlarged front elevational view of the invention attachment;

FIGURE 3 is a vertical section taken on line 3—3 of FIGURE 2;

FIGURE 4 is a perspective view of the attachment looking from the rear thereof; and FIGURE 5 is a fragmentary horizontal section taken on line 5—5 of FIGURE 4.

Description of the preferred embodiment

In the accompanying drawings, wherein like numerals are employed to designate like parts, the invention attachment is indicated in its entirety by the numeral 10 and is shown in FIGURE 1 as being attached to a well known and very popular developing type camera 11. The camera 11 includes a forward rectangular shutter housing 12, a rearward generally rectangular film housing 13 and an intermediate bellows section 14 of lesser width than the housings 12 and 13 so as to define a side open space 15 between end portions of the housings 12 and 13. As shown in FIGURE 1, the invention attachment is applied to the shutter housing 12 in such a manner that the thermometer proper is located adjacent to the open space 15 and may move close to the film housing 13 as the camera is closed or collapsed.

The invention attachment 10 comprises a front substantially rectangular flat plate or body portion 16 which is vertically elongated during use. At the upper end of the plate 16 and formed integral therewith at right angles thereto is a top tab 17. The tab 17 projects beyond one side of the plate 16 and overlies the top wall of shutter housing 12 and engages the same to prevent downward displacement of the attachment 10.

The invention further includes an L-shaped clip extension 18 on the plate 16 and preferably formed integral therewith. The clip extension extends preferably from the top edge of the plate 16 to a point near its vertical center. The clip extension 18 includes an arm or portion 19 disposed at right angles to the plate 16 and wide enough to span the end wall 20 of shutter housing 12. The clip extension 18 further includes a relatively narrow arm or portion 21 arranged opposite the plate 16 and generally at right angles to the portion 19. The arm 21 is adapted to overlie the front wall 22 of shutter housing 12 and to extend a slight distance inwardly from the end wall 20, as shown. The arm 21 is reversely bent, as indicated at 23, to aid in applying the invention to the camera housing and for the following additional reasons. As shown in FIGURES 3 to 5, the shutter housing 12 has a small projection or bead 25 formed thereon and extending completely around its margin. The upper edge of arm 21 engages beneath the bead 25, as shown, and this prevents upward displacement of the attachment 10 on the camera housing. The coacting tab 17 which is in a plane immediately above the upper edges of plate 16 and arm 21 opposes the top wall of shutter housing 12 and prevents downward displacement of the attachment. As best shown in FIGURES 4 and 5, the intermediate bend of the arm 21 engages behind one vertical portion of the bead 25 and serves to lock the attachment firmly onto the camera and prevents edgewise movement of the plate 16. The gripping action of the entire clip 18 prevents any lateral movement of the attachment. Therefore, the attachment is securely held against movement in any direction.

As shown, the clip extension 18, together with the plate 16, make up a generally U-shaped structure which embraces one end portion of the shutter housing 12. The arm 21 may be tensioned to exert the desired gripping action and by slight bending of the parts, the device may be applied to several different camera models which may have slightly different dimensions.

Preferably, the inner surfaces of the elements 16 and 18 have a felt or similar material lining 24 which prevents marring the camera housing. The attachment 10 is preferably formed of spring sheet metal, although it may be formed of resilient plastic or the like.

The outer face of the plate 16 carries a cardboard or similar material sheet 26 adhesively secured thereto. A conventional calibrated thermometer 27 is attached conventionally at 28 to the plate 16 and rests directly upon the sheet 26. Printed or otherwise marked on the sheet 26 are thermometer scale graduations 29 in degrees Fahrenheit, as shown, over a considerable range of temperatures such as from 10° F. to 120° F. The precise range of the thermometer scale may be varied and it is though that the range shown would encompass the temperatures at which the camera would be normally used. The sheet or card 26, as shown in FIGURE 2, contains other useful printed indicia including recommended developing times for both color film and black and white film corresponding to various sections of the temperature range. The nature of this printed instructional indicia may vary under the invention and FIGURE 2 simply illustrates a preferred example of the format which basically tells the photographer how long to wait for development depending upon various temperatures which may be encountered. In short, the invention eliminates all guesswork insofar as varying temperatures are concerned.

The invention attachment has no moving parts, is essentially unitary and is highly compact, adding virtually no bulk to the camera. The thin plate 16 and the thermometer allow complete folding or closing of the camera and do not interfere with the bellows. The attachment is readily removable and can be removed and applied whenever desired. Its use does not damage the camera and more importantly, no screws, pins or like fasteners are required to attach the invention to the camera. No structural modification of the camera whatsoever is necessary.

An important feature of the invention resides in the location of the thermometer 27 opposite to the exposed end portion of the film housing 13. When the camera is folded, the thermometer will be extremely close to the film pack and in that position will accurately measure the temperature of the film. Then, when the camera is opened for use, the photographer will know at a glance the film temperature and the recommended development time. It is desired to maintain the camera folded when not in use so that the thermometer will be close to the film, which increases the reliability of the attachment. The invention has another important use based on the fact that too much heat can damage the film and the thermometer will indicate temperature excesses and serve as a warning device. The numerous advantages of the invention should be apparent to anyone skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A temperature indicating and developing time indicating device for cameras comprising a unitary resilient sheet material body, said body comprising an elongated thin flat plate adapted to lie against one camera wall, a stop tab on the top end of said plate substantially at right angles thereto and adapted to abut another wall of the camera, an approximately L-shaped extension on one longitudinal edge of said plate including a first arm extending substantially at right angles to the plate projecting in the same direction relative to the plate as the stop tab, a second relatively short arm integral with the first arm and extending generally at right angles thereto and being in opposed spaced relation to the plate, whereby the plate and L-shaped extension constitute a generally U-shaped clip adapted to embrace an end portion of a camera shutter housing, said second arm having an intermediate bend enabling the second arm to have interlocking engagement with a projection on said camera shutter housing, said stop tab being spaced slightly above the upper edges of the first and second arms, and a thermometer and viewable indicia on the side of said plate remote from the stop tab and L-shaped extension.

2. The invention as defined by claim 1, and wherein the interior surfaces of the plate, stop tab and L-shaped extension are lined with soft material.

3. The invention as defined by claim 1, and wherein said body is formed of sheet metal.

4. A temperature indicating and development guide attachment for a developing camera of the class having a forward shutter housing, a rearward film housing and an intervening bellows section, there being an unobstructed space between end portions of said housings at one side of the bellows section, the attachment comprising a clip adapted to embrace the end portion of the shutter housing, a plate integral with said clip and lying upon the rear surface of the shutter housing end portion, a temperature indicating element exposed to view on said plate, development guiding indicia on said plate correlated to the temperature range of said indicating element, and a stop tab on the top of said clip overlying and engaging the top wall of said shutter housing, one edge portion at the top of the clip and opposite the stop tab engaging beneath a rib of the shutter housing and preventing upward displacement of the attachment while the stop tab is preventing downward displacement thereof.

5. The invention as defined by claim 4, and wherein said rib of the shutter housing extends around the margin thereof and includes a vertical rib portion, and said clip includes a resilient arm having an intermediate bend, said bend engaging inwardly of the vertical portion of said rib and having interlocking engagement therewith.

References Cited

UNITED STATES PATENTS

| | | | |
|---|---|---|---|
| 1,502,215 | 7/1924 | Sohst | 24—262 |
| 2,636,240 | 4/1953 | Pokorny | 73—374 |
| 2,794,377 | 6/1957 | Fairbank | 95—13 |
| 2,906,124 | 9/1959 | Chaney | 73—374 |
| 3,196,684 | 7/1965 | Vernon | 73—368 |

NORTON ANSHER, Primary Examiner

C. B. FUNK, Assistant Examiner

U.S. Cl. X.R.

24—81, 262; 73—374